INVENTOR.
ALFRED H. FAULKNER
BY
C. A. Gulbrandsen
ATTY.

INVENTOR.
ALFRED H. FAULKNER
BY
C. A. Gulbrandsen
ATTY.

Oct. 3, 1961 A. H. FAULKNER 3,003,041

ELECTRONIC TELEPHONE SYSTEM AND RINGING TONE GENERATOR THEREFOR

Original Filed Jan. 6, 1958 6 Sheets-Sheet 3

INVENTOR.
ALFRED H. FAULKNER
BY C. A. Gulbrandsen
ATTY.

Oct. 3, 1961 A. H. FAULKNER 3,003,041

ELECTRONIC TELEPHONE SYSTEM AND RINGING TONE GENERATOR THEREFOR

Original Filed Jan. 6, 1958 6 Sheets-Sheet 4

INVENTOR.
ALFRED H. FAULKNER

BY C. A. Gulbrandsen

ATTY.

INVENTOR.
ALFRED H. FAULKNER
BY C. A. Gulbrandsen
ATTY.

INVENTOR.
ALFRED H. FAULKNER
BY
C. A. Gulbrandsen
ATTY.

3,003,041

ELECTRONIC TELEPHONE SYSTEM AND RINGING TONE GENERATOR THEREFOR

Alfred H. Faulkner, Redondo Beach, Calif., assignor to Automatic Electric Laboratories, Inc., a corporation of Delaware Original application Jan. 6, 1958, Ser. No. 707,298. Divided and this application Feb. 20, 1959, Ser. No. 794,619
6 Claims. (Cl. 179—84)

This invention relates to an electronic telephone system and a ringing tone generator therefor, and more particularly to an arrangement for supplying ringing current in tone form to telephone subsets using tone signalling in lieu of conventional ringers. The present application is a division of my co-pending application Serial No. 707,298, filed January 6, 1958, for an Electronic Switching System.

The principal object of the invention is to provide an improved circuit arrangement for signalling the called line.

According to the invention, a ringing tone generator is provided which includes an oscillator for producing tone output at three different frequencies in sequence in a melodic combination. The oscillator is triggered by an input signal applied to any one of three input circuits, the frequency being determined according to the input circuit signalled.

According to a further feature, a tone sequence control circuit comprising three transistor amplifiers in a switching arrangement is provided to supply a D.C. signal to the three oscillator input signals in sequence.

Another feature relates to an interrupter for inhibiting the sequence control circuit after three sequences of three tones each, to introduce a spacing interval of a specified duration, before allowing another group of three sequences.

The tones from the generator are connected at the central office to a called line for reproduction by a loudspeaker in the subset on that line to produce a chime-like ringing signal.

The above-mentioned and other objects and features of this invention and the manner of attaining them will become more apparent, and the invention itself will be best understood by reference to the following description of an electronic switching system embodying the invention, taken in conjunction with the accompanying drawings comprising FIGS. 1 to 7 wherein.

Figure 4A:
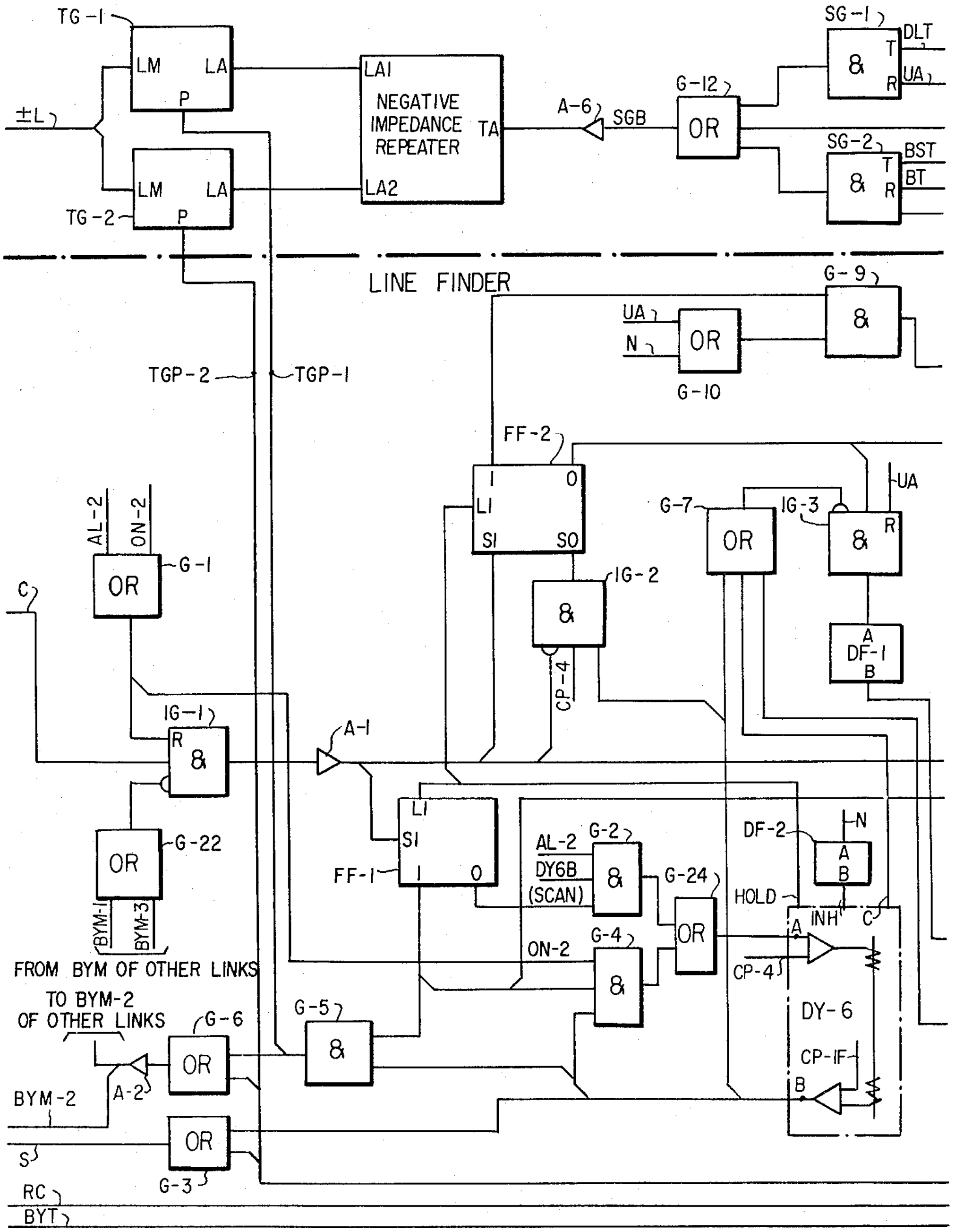
Figure 4B:
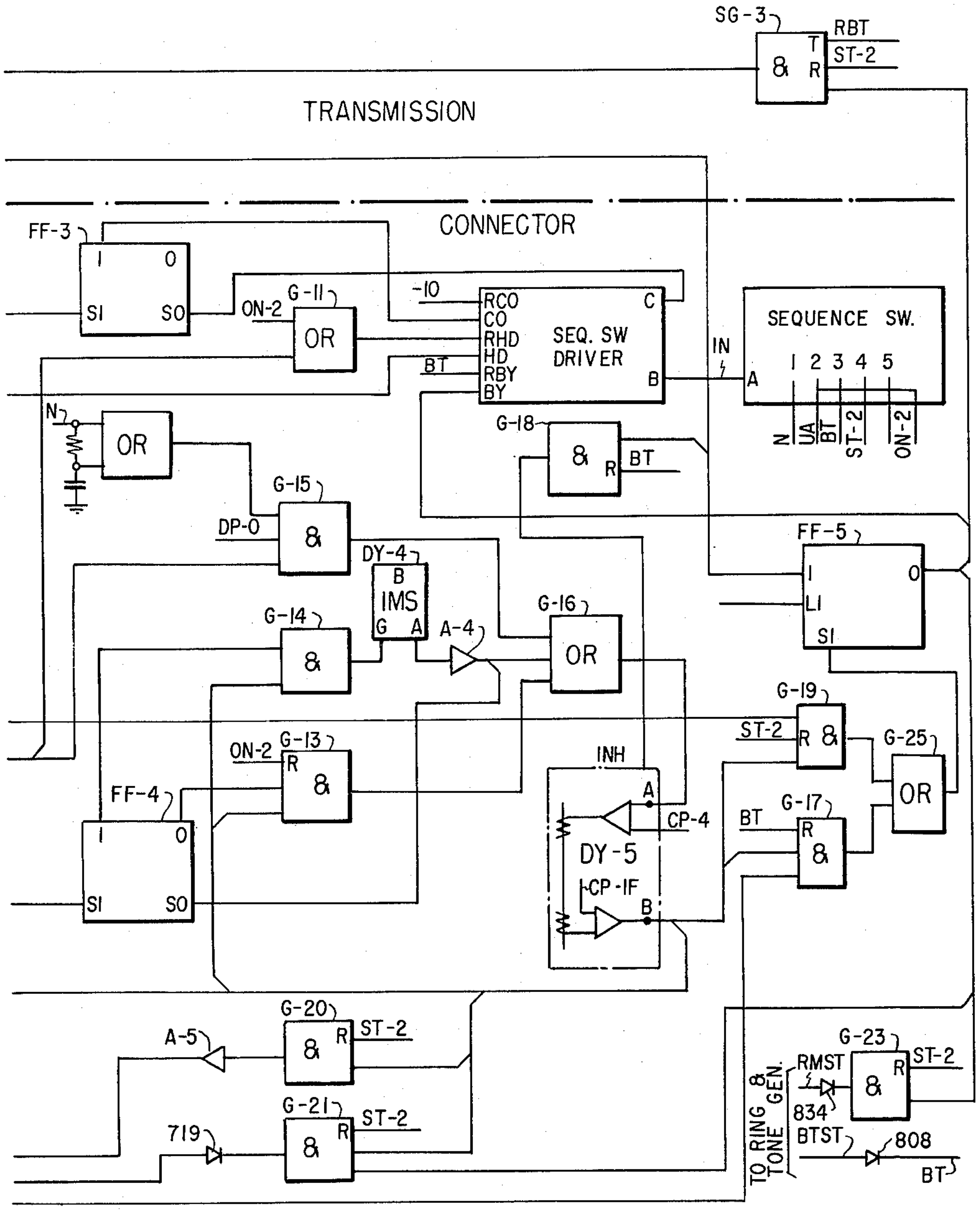
Figures 5, 6, 7:
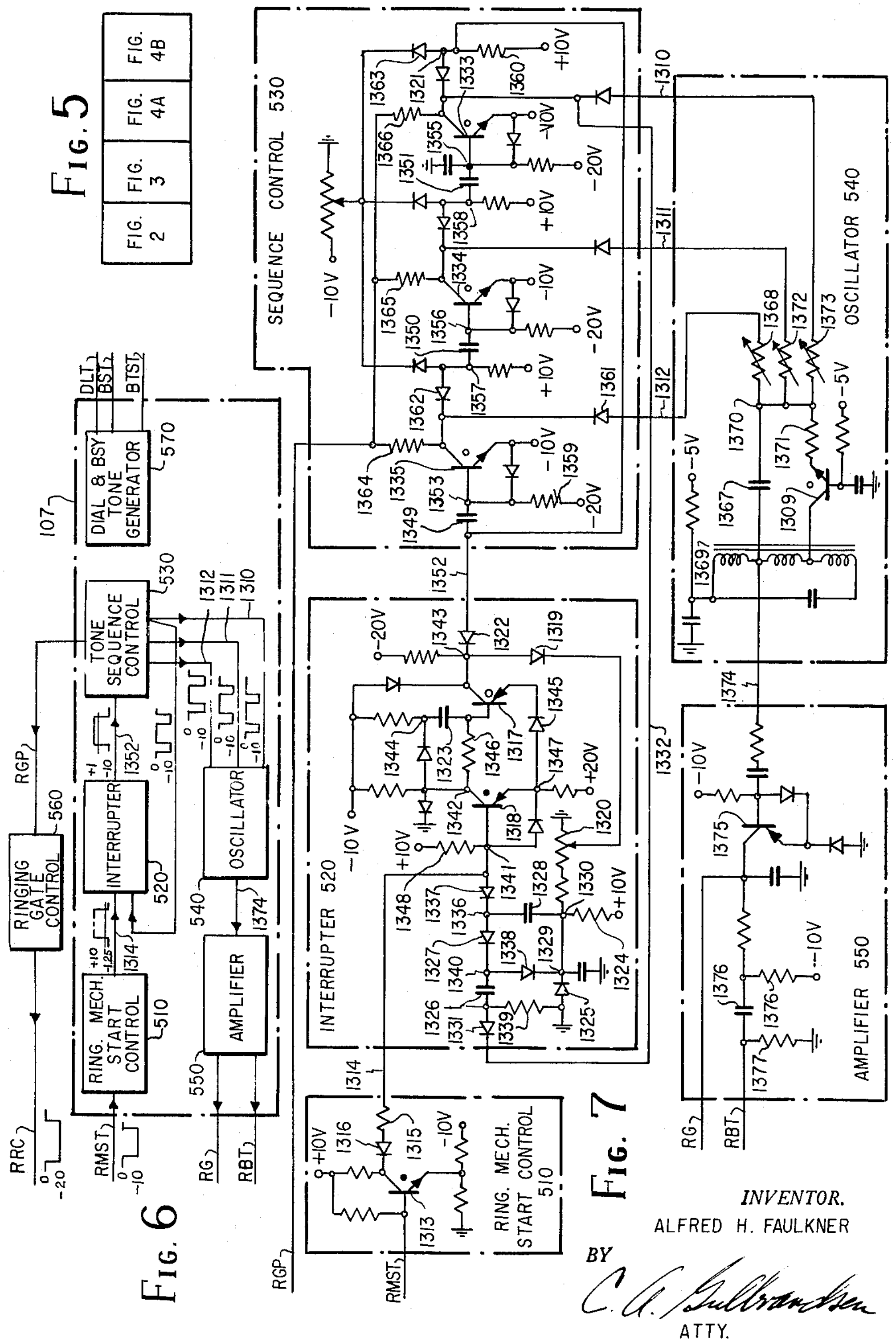

FIGS. 4A and 4B comprise a functional block diagram of one of the links;

FIG. 5 shows how FIGS. 2, 3, 4A and 4B should be arranged together;

FIG. 6 is a block diagram of the ring and tone generator; and

FIG. 7 is a schematic diagram of the ringing tone generator.

A. GENERAL OPERATION

This system employs a time division multiplex arrangement having a time slot per line. Each time slot provides two-way transmission between its line circuit and a link. In each link, the line finder and the connector each includes a delay line with an arrangement for coupling the delay-line output and input to circulate pulses. These pulses are used in conjunction with distributor pulses to control the multiplex transmission, and are also used for various other functions. During a connection, the circulating delay lines of the line finder and the connector deliver output pulses respectively in the time slots of the calling and the called lines.

In operation, one of the idle links is allotted for the next call. Scanning pulses are transmitted through the line finder delay line of the allotted link to the line circuits. Detection of a calling condition on a line causes the delay line of the finder to circulate pulses in the time slot of the calling line, and the corresponding delay line of the connector to circulate pulses in time slot zero.

Conventional dial impulses are transmitted from the calling station to its line circuit, and from there over a multiplex control connection to the link. Each dial impulse causes the circulating pulses in the connector delay line to be advanced one time slot, from zero to one, and then to succeeding time position; so that at the end of the dialled digit these circulating pulses are in the time slot of the called line.

The busy test, switch through, ringing, and answer then occur in succession. Release of both lines at the termination of a call causes further circulation of pulses in the delay lines of both the finder and connector to be inhibited.

B. GENERAL IDENTIFICATION OF THE SYSTEM

Figure 1:
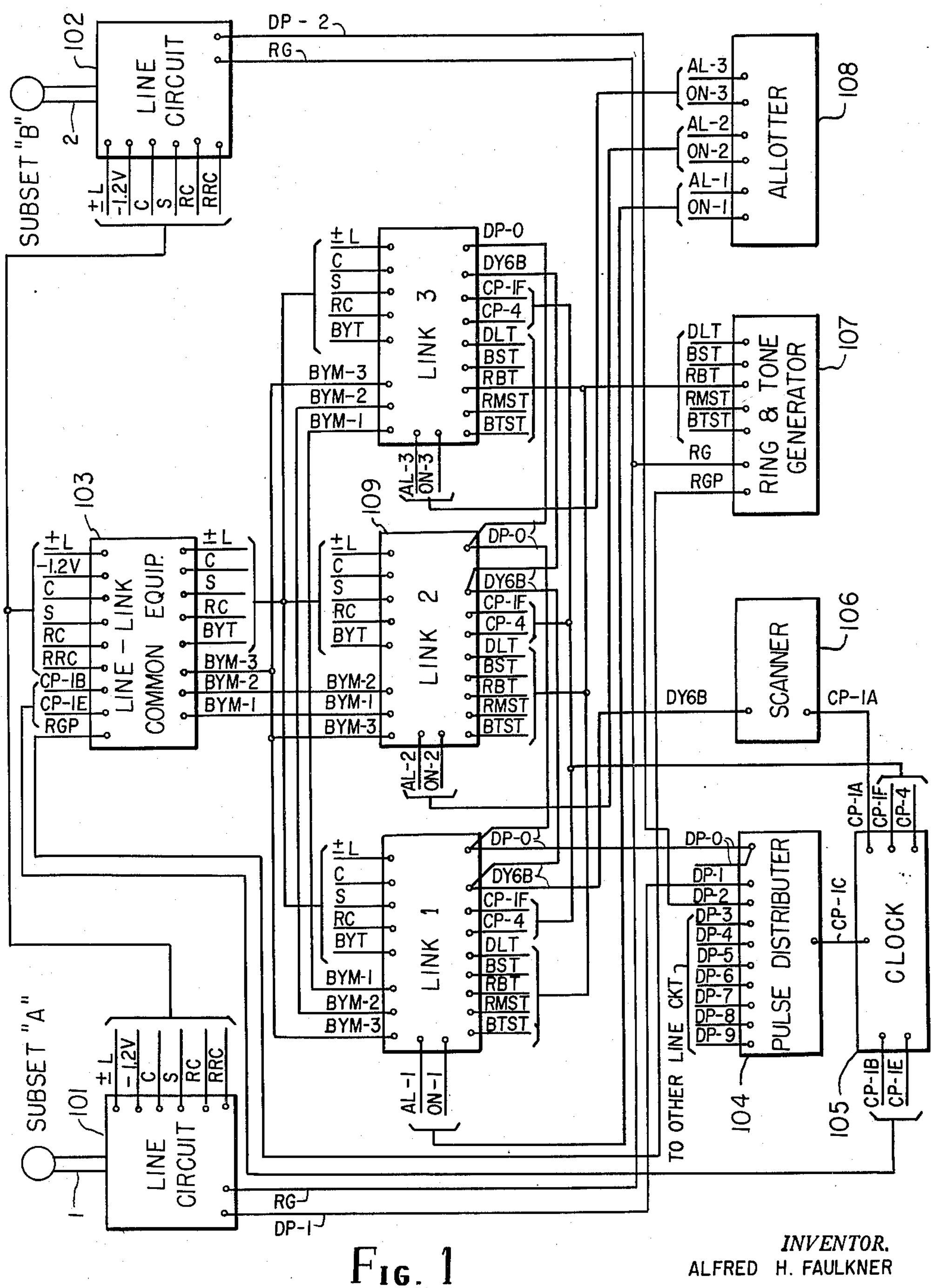
FIG. 1 is a block trunking diagram of the electronic switching system shown herein by way of example, only two of the line circuits being shown.

FIG. 1 shows the entire system except that only two line circuits have been illustrated. The present embodiment of the system is a design for 10 lines although it could be expanded to a greater number within the scope of the invention.

The two line circuits 101 and 102 shown in FIG. 1 are associated with subsets "A" and "B" and connected thereto by lines 1 and 2.

All the line circuits of the system are connected in common to the line-link common equipment as shown, and also in common to lead RG of the ring and tone generator. Each line circuit has a connection individual to itself and connected to the pulse distributor. Thus leads DP–1 to DP–0 are the leads over which each line circuit is assigned its particular time slot in the time division multiplex system.

Lead ±L is the common highway of the system over which intelligence of the system, comprising voice and tone signals, is transmitted. Lead −1.2V is used for clamping and, for convenience, the diodes associated therewith are placed in the line-link common equipment. Lead C and lead S are control leads over which a link is seized and dialling occurs. Leads RC and RRC are control leads over which ringing is controlled.

The line-link common equipment 103 performs various functions such as amplifying pulses transmitted between the link and line circuits of the system and also clamps the common highway between pulse periods to prevent cross talk.

Lead RGP is associated with the ring and tone generator and is instrumental in subscriber ringing. Lead BYT and leads BYM–1, BYM–2, BYM–3, which are respectively associated with the three link circuits, are utilized to prevent the calling line from seizing more than one link. Lead CP–1E is utilized to produce sharper pulses on leads C, RC, S, and BYT, and lead CP–1B has a pulse impressed thereon which helps prevent cross talk.

There are three links shown in this system which are identical, each comprising a line finder, a connector and a transmission circuit which controls voice transmission and also introduces dial tone, busy tone and ring-back tone into the transmission system over leads DLT, BST, and RBT respectively.

A signal on lead BTST starts busy tone on the busy tone lead BST. Lead RMST starts the ringing generator in the ring and tone generator circuit. Leads CP–4 and CP–1F shape and synchronize the pulses in the time slots which are admitted to a link circuit. Leads AL–1 to AL–3 and ON–1 to ON–3 are from the allotter and determine which link will be assigned to the next calling subscriber.

The allotter circuit itself is a ring-of-three counting chain arranged to allot a call to an idle link.

The pulse distributor circuit feeds pulses to the line circuits in their assigned time slot over the leads DP–1 to DP–0. Also, lead DP–0 is connected to the links for dialling purposes.

The clock circuit is essentially an oscillator which produces variously spaced pulses which control timing and pulse generating circuits.

The scanner introduces a 1.5 microsecond pulse every 22 microseconds over lead DY6B into the links whereby the links scan the line circuits and test for a calling line.

The ring and tone generator circuit produces dial tone over lead DLT, busy tone over lead BST, and ring-back tone over lead RBT. Leads RG and RGP are utilized to provide ringing to the line circuits.

One of the links is shown in functional block diagram form in FIGS. 4A and 4B. The logic gates G–1 to G–25 may be of the type having a diode connected between each input lead and the common output lead, and having a resistor connected from the output lead to a source of D.C. potential; except that in some of the "and" gates this resistor is connected in place of a diode between the output lead and one of the input leads designated R, the D.C. potential being applied from an external source to this input. The "and" gates have ground potential at the output until all the inputs are negative, then the output is negative; and the "or" gates have the output at ground potential until any one input is negative, then the output is negative. The gates IG–1 to IG–3 are "and" gates, except that one of the inputs designated by a semi-circle is an inhibit lead. A negative signal on this inhibit lead blocks negative input pulses at the other inputs from reaching the output.

The signal gates SG–1 to SG–3 pass a tone signal at input T when negative signals are applied simultaneously to the other input leads.

The transmission gates TG–1 and TG–2 control the transmission of signals in both directions between audio at lead LA and time division multiplex at lead LM in a time slot of control pulses applied to terminal P. The negative impedance repeater amplifies signals in both directions between the LA leads, and also couples signals from the lead TA to one of the transmission gates.

Amplifiers are represented by a triangular form.

The differentiating circuits DF–1 and DF–2 are circuits including a series condenser and a shunt resistor for converting a change of potential at the input A to a pulse at the output B.

Each of the flip-flop circuits FF–1 to FF–5 has up to five external connections, leads S0, S1, 1, 0, and L1. Normally a negative potential is present on the lead L1, in which case a pulse on the S1 lead places a negative potential on lead 1 and removes it from lead 0, and conversely a pulse on the lead S0 places negative potential on lead 0 and removes it from lead 1. If a negative potential does not appear on lead L1, then the flip-flop cannot be set to have a negative potential on lead 1.

If a pulse of over 20 microseconds duration is placed upo neither lead S1 or S0 when the other is at constant potential, the flip-flop will reset itself. That is, a pulse of over 20 microseconds in duration on lead S1 will cause a negative potential to be placed on lead 1 at the beginning of the pulse and ground to be placed on lead 1 at the end of the pulse. However, a differentiating circuit placed in the S1 lead will prevent the flip-flop from resetting itself regardless of the pulse duration. Since the flip-flop circuit is symmetrical, a similar action will occur with a pulse of over 20 microseconds duration on lead S0.

Summarizing for the flip-flops, a pulse of less than 20 microseconds in duration on lead S0 causes negative potential to be placed on lead 0, and ground on lead 1 and a pulse of less than 20 microseconds on lead S1 causes a negative potential to be placed on lead 1 and ground on lead 0. This assumes a negative potential on lead L1 which is the normal condition, but if the negative potential does not appear on lead L1, then negative potential cannot appear on lead 1. If a pulse of over approximately 20 microseconds appears on lead S0 or S1 then the flip-flop will reset itself at the end of the pulse.

The circuits DY–2 and DY–5 are magnetostriction delay lines. They comprise a nickel tube with a transmitting coil and a receiving coil wound thereon. A blocking oscillator circuit feeds an electrical impulse to the transmitting coil responsive to an input pulse at terminal A, and an electrical circuit associated with the receiving coil shapes and forms the pulse and transmits it to the output terminal D. The pulses are synchronized by clock pulses applied to the lead CP–4. Delay is obtained by the time required for a mechanical pulse to travel in the nickel tube from the transmitting coil to the receiving coil. Thus, a pulse at input A results in a regenerated pulse at output B delayed a given time.

These magnetostriction delay lines are also provided with auxiliary features. A negative potential on the inhibit lead INH blocks output at B. In delay line DY–2, a negative potential is produced on the hold lead by a train of pulses recirculated in the delay line. A negative potential is placed on lead C during the time that there is a pulse at input A.

Circuit DY–4 is a wire wound electrical delay line having a shield extending the length of the line. The terminals A and B are the opposite ends of the wire, and terminal G is connected to the shield. This is a one microsecond delay line which is open circuited at the terminal B. Therefore, a pulse is reflected to provide a total delay of 2 microseconds.

The sequence switch driver performs the function of generating pulses for advancing the sequence switch. Simultaneous −10 volt input signals on hold lead HD and resistance input to hold gate RHD causes −10 volt pulses delayed an interval of T1 microseconds on terminal B and simultaneously −5 volt pulses on lead C to be generated. Similar delayed pulses, delayed by intervals of T2 and T3 microseconds are generated when −10 volts is applied simultaneously to changeover leads CO and RCO or busy test leads BY and RBY. The time duration T1 is greater than T2 which is greater than T3.

The sequence switch circuit has five steady state conditions and it is in its home or normal position when negative potential appears on lead N. An input pulse on lead A causes the negative potential condition to advance to lead UA and a subsequent pulse on lead A will cause the negative potential condition to advance to lead BT and so on until it reaches its home position again and the cycle has been completed. When the negative potential condition is advanced to lead UA, there is also a negative potential condition on lead ON and that condition remains there as long as the circuit is not in its home or normal position.

For schematic diagrams and a detailed description of all of the circuits of the system, reference may be made to the parent application.

C. OVERALL OPERATION OF THE SYSTEM

C1. *Seizure of a calling line*

The operation of the system will be described with reference to FIGS. 2, 3, 4A and 4B, which should be arranged as shown in FIG. 5. The common equipment, including the pulse distributor, clock, scanner, ring and tone generator, and allotter, are not shown, but leads which are associated with any of these circuits are so marked.

Functional symbols are employed to describe the operation of the link circuit while the details of the line circuits and line-link common equipment are shown.

Let us assume that the allotter has assigned link 2 to be seized by the next calling party. A potential of −10 volts then appears on lead AL–2. The scanner places a negative output pulse on lead DY6B every 22 microseconds. Flip-flop FF–1 (FIG. 4A) is in its "flop" position which means that the 0 lead of FF–1 will have −10 volts thereon, it being assumed that the normal position is the "flop" position. Therefore, it can be seen in FIG. 4A at gates G–2 and G–24 that a pulse will be gated through to lead A of delay line DY–2 every 22 microseconds. This pulse is of the same shape and phase as the pulse on lead DY6B.

This pulse is fed into delay line DY–2 and emerges 20 microseconds later at lead B of delay line DY–2. This pulse is fed through gate G–3 to lead S, therefrom into the line-link common equipment and into the base of transistor 308 which is an impedance matcher, and from there the pulse travels to all the line circuits over lead S but with no effect at this time. As can be seen, one line circuit is scanned every 22 microseconds, or in other words, a pulse appears in a new time slot every 22 microseconds. Therefore each line circuit is simultaneously pulsed by the pulse-distributor and the scanner only once every 220 microseconds or 4550 per second.

The pulse distributor sends a pulse to each line circuit in its time slot every 20 microseconds. The remainder of the pulses on leads DP–2 to DP–0 are the same but only 2 microseconds apart.

Even when a pulse appears on lead S at the same time that a pulse appears on a DP–N lead, for instance lead DP–1, there will be no effect on the system until the calling party initiates the call. Let us assume that the calling party is at subset "A" which is connected to line circuit 101 by line 1. When the calling party initiated a call, a circuit is completed from ground through resistor 202, a winding on transformer 201, the calling party's line loop, diode 203, inductor 204, and a second winding on transformer 201 to −20 volts. The loop resistance is compensated in the calling party's subset "A" and all other subsets to provide a line circuit of 30 milliamperes. Thus there is a 10 volt drop across resistor 202 which appears across diode 205, biasing it in the reverse direction. Point 209 remains near ground, however, due to the shunt paths through diode 207 and 208 to ground on leads DP–1 and S respectively. Actually there is approximately +1.5 volts on lead DP–1.

When the calling party has initiated the call by closing the subscriber loop circuit and a pulse appears simultaneously on leads S and DP–1, then point 209 swings to −5 volts and transmits a pulse over lead C to the preselected link, which is link 2 in this example. The pulse is sent through an emitter follower amplifier associated with transistor 301 in the line-link common equipment, where impedance matching occurs. From there the pulse is transmitted to inhibit gate IG–1 of link 2.

Since the allotter has preselected link 2, −10 volts appears on lead AL–2, which is gated through gate G–1 to gate IG–1. The gate IG–1 therefore opens when the first pulse arrives on lead C and that pulse is fed to amplifier A–1, and from there to flip-flop FF–1, lead S–1. This flips flip-flop FF–1 which removes −10 volts from lead 0 and places −10 volts on lead 1 causing gate G–2 to close. Gate G–4 now opens as a negative voltage is placed on lead ON–2, as will be seen later, and on lead 1 of flip-flop FF–1, and also because of the pulse on lead DY2B which is the scanning pulse just described.

Therefore the pulse on DY2B is fed back to the input lead DY2A through gates G–4, G–24 and a pulse in time slot 1 corresponding to the calling party will circulate in the delay line DY–2.

The recirculation pulses are also sent to gate G–5 which is now opened by these pulses because −10 volts appears on lead 1 of flip-flop FF–1. From gate G–5 the pulses are sent to the calling party transmission gate TG–1. These pulses are also sent through gate G–6 and amplifier A–2 to the busy mark amplifier associated with transistor 307. The pulses which emerge from the busy mark amplifier are fed back to the links over lead BYT to gate G–17 of each link where they are used in testing for a busy called party as will be seen later.

The recirculating pulses, which emerge from amplifier A–2, are also fed to the other links over lead BYM–2 to gate G–22 of the other links, where they are used to block the seizure of the other links by the same calling party.

The recirculating pulses are also sent through gate G–3 to lead S and from lead S to diode 208 where these pulses arrive simultaneously with the pulses on lead DP–1. Thus, the line circuit associated with line 1, or the calling party line, is connected to link 2, since the pulses on leads DP–1 and S thereafter occur simultaneously at 20 microsecond intervals.

The first pulse on lead C which initiated the foregoing also was fed to flip-flop FF–2 lead S–1 where it flipped flip-flop FF–2 thus causing −10 volts to be removed from lead 0 and placed on lead 1 of flip-flop FF–2. This causes a step voltage to be applied through gate G–9 to input S–1 of flip-flop FF–3. Gate G–9 is opened by the step voltage from flip-flop FF–2 because there is a negative voltage on lead N at this time, thus enabling gate G–9 to pass a step voltage.

Flip-flop FF–3 therefore flips and a step voltage is generated at lead 1 of flip-flop FF–3 and applied to input CO of the sequence switch driver causing it to generate a pulse at each of its outputs, B and C, after a brief delay. The pulse on lead C of the sequence switch driver flops flip-flop FF–3, resetting it. The pulse on lead B of the sequence switch driver is fed to the input A of the sequence switch, and causes the sequence switch to advance from its N or normal position to the UA position. This results in −10 volts being removed from lead N and being placed on lead ON–2, which causes the allotter to advance, and remove −10 volts from lead AL–2. Gates G–4 and IG–1 receive −10 volts through gate G–1 from lead ON–2 in place of lead AL–2.

When flip-flop FF–1 flipped, it also opened gate G–15 to permit pulses on lead DP–0 in the "0" time slot to pass through gates G–15 and G–16 to the input A of delay line DY–5, causing it to generate pulses at its output lead B, which are in the "0" time slot. These output pulses have no effect at this time. Following the brief delay introduced in the sequence switch driver, the sequence switch transferred −10 volts from lead N to lead ON–2, thereby closing gate G–15 and opening gate G–13 to complete a recirculating path from output lead B of delay line DY–5 to the input A of delay line DY–5 through gates G–13 and G–16. Therefore delay line DY–5 continues to generate pulses at output B in time slot "0" independently of the pulse distributor lead DP–0.

With the sequence switch in position UA, −10 volts is applied to the signal gate SG–1 enabling the signal gate SG–1 to transmit dial tone from lead DLT through gate G–12 and amplifier A–6 to the negative impedance repeater and thence through the transmission gate TG–1 to the calling party's line over the voice transmission common highway lead ±L. The link is now prepared to receive dial impulses.

C2. *Dialling*

When the calling party dials and the calling line is opened by the dial impulses, the point 209 is clamped to ground through diode 205 and resistor 202, thus interrupting the train of pulses on lead C in time slot 1 for the duration of the dial impulse. In the absence of these pulses, inhibit gate IG–2 passes the pulses which are on lead B of delay line DY–2 to the input S0 of flip-flop FF–2 causing it to flop which in turn flips flip-flop FF–4 through inhibit gate IG–3 and the differentiating circuit DF–1.

The −10 volts on lead 1 of flip-flop FF–4, when it is in its flipped position, opens gate G–14 to the output pulses of delay line DY–5, and ground on lead 0 of flip-flop FF–4 closes gate G–13 which interrupts the recirculating path previously mentioned. The next output from lead B of delay line DY–5 passes through gate G–14 to delay line DY–4, which is a 2 microsecond delay line, since the pulse travels the length of delay line DY–4 in one microsecond, is reflected at the open-circuited end and returns to the input after a total delay of 2 microseconds. The reflected pulse passes through amplifier A–4 and gate G–16 to the input A of delay line DY–5 to trigger it in time slot "1." The pulse from amplifier A–4 also flops flip-flop FF–4 which opens gate G–13 and closes gate G–14. The recirculating pulse in delay line DY–5 now recirculates in time slot "1" instead of time slot "0."

At the end of the first dial impulse, the calling party's line is closed, and as a result, pulses in the calling party's time slot "1" again appear on lead C. This occurs because point 209 is no longer clamped to ground through diode 205 and resistor 202. These pulses cause inhibit gate IG–2 to block pulses from lead B of delay line DY–2 and the first of these pulses flips flip-flop FF–2 which in turn flips flip-flop FF–3. Flip-flop FF–3 applies −10 volts to input C0 of the sequence switch driver but not long enough to cause the sequence switch driver to operate before the next impulse, if any, of the dialled digit is received.

At the start of the second impulse, the calling party's line is opened, again clamping point 209 to ground and interrupting the pulses on lead C. Flip-flop FF–2 is flopped again to cause the pulse in delay line DY–5 to advance to time slot "2" in the same manner as described for the first dial impulse. Thus the pulse which recirculates in delay line DY–5 is advanced one time slot for each dial impulse.

When flip-flop FF–2 flops at the start of a dial impulse it causes flip-flop FF–3 to flop also, thus preventing operation of the sequence switch driver during the series of impulses because the voltage present at lead C0 of sequence switch driver is not held there long enough to enable the sequence switch driver to generate a pulse at B to advance the sequence switch. Flip-flops FF–2 and FF–3, in turn, flip at the end of each impulse, as described previously.

C3. *Busy test*

Assume that the called party corresponds to the dialled digit "2," and therefore that two dial impulses are received. After the last impulse of the dialled digit has been received, flip-flop FF–3 remains flipped; therefore the sequence switch driver generates a pulse after a brief delay, and advances the sequence switch to its busy test position BT. Then position UA has ground thereon which blocks inhibit gate IG–3, preventing further operation of flip-flop FF–4; and ground on positions UA and N blocks gate G–9 which prevents further operation of flip-flop FF–3.

The voltage on lead BT is applied to input RBY of the sequence switch driver thus preparing the sequence switch driver for busy test. The voltage on lead BT also opens gate G–17 to coincident pulses from lead BYT and delay line DY–5. In the event the called line is busy, a pulse in the called line's time slot will appear on lead BYT coincident with the pulse circulating in delay line DY–5. If this is the case then gate G–17 will open and a pulse will pass through gates G–17 and G–25 and flip flip-flop FF–5. This places −10 volts on lead 1 and ground on lead 0 of flip-flop FF–5. The ground on lead 0 of flip-flop FF–5 is sent to the input BY where it prevents the sequence switch driver from generating a pulse which would advance the sequence switch at this time.

The −10 volts on lead BT enables gate G–18 to pass the step voltage on lead 1 of flip-flop FF–5 to the inhibit input INH to stop the circulating pulses in delay line DY–5. At the same time, the step voltage from flip-flop FF–5, lead 1, opens supervisory gate SG–2 to transmit busy tone to the calling party through gate G–12, amplifier A–6, the negative impedance repeater, and the transmission system to the calling party in the same manner as dial tone. Busy tone appears on lead BST because the −10 volts on lead BT is sent through diode 808 to lead BTST thereby causing the busy tone to be placed on lead BST. Release from a busy condition is similar to release from a completed call condition and is readily ascertained by reference to the section entitled "Release."

C4. *Switch through*

If the called line is not busy there is no output from gate G–17 during the busy test interval. Therefore, −10 volts remains on lead 0 of flip-flop FF–5 and is fed to input BY of the sequence switch driver and this enables the sequence switch driver to generate a pulse, after a brief delay, which advances the sequence switch to its switch-through position ST–2. This action grounds lead BT to prevent further generation of pulses by the sequence switch driver and closes gates G–17 and G–18.

The −10 volts on lead ST–2 permits the pulse circulating in delay line DY–5 to pass through gate G–20, amplifier A–5, gate G–6, amplifier A–2 to lead BYM–2, and back through the busy mark amplifier in the line-link common equipment to the busy mark lead BYT, to mark the called line busy. The pulses from delay line DY–5 emerging from amplifier A–5 also flow through gate G–3 to lead S and to input P of transmission gate TG–2 to prepare a transmission path to the called line circuit.

C5. *Ringing*

The −10 volts on lead ST–2 also opens gate G–21 to pass pulses from lead B of delay line DY–5, through diode 719 to lead RC. The pulses in the called line time slot on lead RC are transmitted through the amplifier in the line-link common equipment associated with transistors 303 and 304 to point 271 in the line circuit 102 associated with the called line, and to all other similar points in the remaining line circuits. The input pulse to the amplifier associated with lead RC is −5 volts, but the output pulse is an 8.5 volt pulse, going from +1.5 volts when the pulse is absent to −7 volts during the time the pulse is on. The −10 volts on lead ST–2 coupled with the −10 volts on lead 0 of flip-flop FF–5 open gate G–23 and through diode 834 place approximately −10 volts on lead RMST. This starts the operation of the ringing generator which causes three different audio tones to be placed in sequence on lead RG. This sequence is repeated three times, followed by a pause of about three seconds before the sequence is started again. Also, current flows over lead RGP from the Ring and Tone Generator during the time that the sequence of tones appears on lead RG.

When the sequence of tones is being fed to the line circuit over lead RG, current flows over lead RGP to transistor 309 in the line-link common equipment and causes transistor 309 to saturate, which in turn causes transistor 310 to saturate, to place −20 volts on lead RRC. Therefore −20 volts is fed to all the line circuits over lead RRC.

For the duration of the coincidence pulses on leads DP–2 and RC, −5 to −7 volts is applied from point 271 to point 272 of transformer 273 through diode 274. Lead RG, which is connected to terminal 275 of transformer 273, is alternately clamped to ground and raised to −10 volts at the ringing frequency rate. Assuming that lead RG is clamped to ground the current flow in winding 276 of transformer 273 increases linearly at a rate determined by the applied voltage and the inductance of winding 276 of transformer 273 reaching 3 to 4 milliamperes by the end of time slot "2."

The secondary winding 277 of transformer 273 is effectively open-circuited at this time since the induced voltage biases diode 278 in the reverse direction because of the winding arrangement of transformer 273.

When the pulse on lead DP–2 expires it clamps point 271 to +1.5 volts through diode 281. The flux in transformer 273 now commences to decay, reversing the voltage induced in its secondary and causing a current to flow through diode 278 and the base-emitter path of transistor 280. The low forward resistance of this circuit beyond the characteristic knee limits the voltage across winding 277 of transformer 273 to between ½ and 1 volt. The flux therefore decays at only one-tenth the rate at which it rose during the input pulse.

The primary voltage is also limited by reason of the nature of the secondary load, hence diode 274 remains reverse-biased. Current flows in the secondary winding 277 of transformer 273 for practically the entire 18 microsecond interval between successive input pulses.

Capacitor 279 smooths the waveform so as to provide a continuous drive to the base of transistor 280. The amplified current from the collector of transistor 280 flows over lead −L and a 50 volt Zener diode 281, in subset "B" to ground through the speaker transformer 282. This current varies in accordance with the ringing signal on lead RG thereby producing an audible signal at subset "B."

The ring back tone is placed on lead RBT and since −10 volts is on lead ST–2, gate SG–3 opens and allows ring back tone to be sent into the transmission system in a similar manner as the dial tone and busy tone previously mentioned.

C6. *Answer*

When the called party answers, the −10 volts developed across resistor 252 by closure of the line loop causes a pulse train to be transmitted over lead C as described above. These pulses arrive at gate G–19 coincident with those from delay line DY–5 and pass through gates G–19 and G–25 to flip flip-flop FF–5. Ground on lead 0 of flip-flop FF–5 closes gate G–21 to block pulses in the called party's time slot from reaching lead RC which causes ringing to be interrupted because diode 292 is not blocked any longer. Ground on lead 0 of flip-flop FF–5 also blocks gate SG–3 which interrupts ring back tone.

C7. *Transmission*

The calling party and the called party are now in a condition permitting a bi-directional exchange of information. The calling party at subset "A" will transmit and receive intelligence to and from the transmission section of the link circuit in its particular assigned time slot and the called party at subset "B" will do likewise in its particular assigned time slot. The intelligence transmitted by the calling party must be stored in the transmission section of the link circuit until the called party's time slot occurs and vice versa.

The transmission gate TG–A in line circuit 101 comprises diodes 214 and 216, a storage condenser 215, a PNP transistor 210, and associated bias circuits. Similarly transmission gate TG–B in line circuit 102 comprises diodes 264 and 266, storage condenser 265, transistor 260, and bias circuits. The transmission gates TG–1 and TG–2 in the link are similar, except that the transistors at NPN type, the diodes are poled in the opposite directions, and the biasing is different. Pulses in each case are applied to the base of the transistor to open the gate.

Referring particularly to the transmission of intelligence between the calling party's line circuit and the link transmission gates TG–A in the calling party's line circuit and TG–1 in the link circuit are pulsed open simultaneously during the calling party's time slot. The intelligence transmitted to the link during the calling party's time slot is stored until transmission gates TG–B in the called party's line circuit and TG–2 in the link circuit are simultaneously opened during the called party's time slot, thus enabling the intelligence stored in the link to be sent to the called party, and this is repeated 50,000 times each second. The operation of the transmission circuit in the opposite direction of transmission is similar.

C8. *Release*

In the event that the called party disconnects first, the pulses on lead C in the called time slot are blocked in a manner which has been explained. However, pulses in the calling time slot remain on lead C because they circulate over leads S and C through the calling line circuit. Thus there is no effect on the link circuit at this time. When the calling party subsequently disconnects, the pulses on lead C in the calling time slot are also blocked. This causes flip-flop FF2 to flop, because a pulse from delay line DY–2 on lead B is passed through inhibit gate IG–2 (because of the lack of coincidence of pulses in time slot "1" or the calling party's time slot) to input SO of flip-flop FF–2. There now appears a −10 volts on lead 0 of flip-flop FF–2. The −10 volts on lead 0 of flip-flop FF–2, which is fed to input HD of the sequence switch driver, and the −10 volts on lead 1 of flop-flop FF–1 which is passed through gate G–11 to input RHD of the sequence switch driver, enable the sequence switch driver to generate two pulses which advances the sequence switch to its normal or N position. The −10 volt step voltage on lead N is applied to differentiating circuit DF–2, to produce a brief pulse on the inhibit input INH of delay line DY–2 to block the pulses circulating therein. The Hold lead of delay line DY–2 the restores from −10 volts to ground. The removal of −10 volts from the Hold lead of delay line DY–2 flops flip-flop FF–1 and maintains it flopped and also maintains flip-flop FF–2 flopped. Flip-flops FF–1 and FF–2 are incapable of being operated until −10 volts appears at the Hold lead of delay line DY–2 which occurs when pulses are sent through the delay line when the link is again selected for a call by the allotter.

The absence of −10 volts from lead 1 of flip-flop FF–1 plus the absence of −10 volts from lead ON–2 of the sequence switch, blocks gate G–11 and thereby removes −10 volts from input RHD of the sequence switch driver, thus preventing the generation of another pulse and thereby maintaining the sequence switch in its N or normal position.

With an absence of −10 volts on lead ON–2, gate G–13 is blocked, thus blocking the recirculation of pulses in delay line DY–5 and also flops flip-flop FF–5 and maintains it so. All gates, which were opened during switch-through, are now closed.

In the event that the calling party disconnects first, the pulses on lead C in the calling time slot are blocked while those in the called time slot remain. In the absence of a coincident pulse on lead C, inhibit gate IG–2 passes pulses from delay line DY–2, lead B, to lead SO of flip-flop FF–2 causing it to flop. But flip-flop FF–2 is flipped by the next pulse on lead C in the called time slot, hence it oscillates at 50,000 cycles per second having −10 volts on lead F at least ten percent of the time depending on the particular time slots involved in the established connection. As long as flip-flop FF–2 continues to oscillate between its flip and flop positions the sequence switch driver is not given time to generate a pulse and hence the link is held by the called line. When the called party subsequently disconnects, flip-flop FF–2 is no longer flipped by pulses on lead C and the release is effected in the same manner as previously described.

Release from a busy condition is similar to what has previously been described. When the calling party disconnects, flip-flop FF–2 flops from a pulse from lead B of delay line DY–2 which is passed through inhibit gate IG–2 to input SO of flip-flop FF–2. This places −10 volts at input HD, which combined with the −10 volts placed on RHD, causes the sequence switch driver to generate three pulses and advance the sequence switch to its N or normal position in a manner understood by reference to the previous parts of this section.

D. DETAILED DESCRIPTION

D1. *Ringing tone generator*

Instead of a conventional ringing signal this system uses three different audio tones in sequence. This sequence is repeated three times followed by a pause of about three seconds.

A block diagram of the ringing generator is shown in FIG. 6. The ring and tone generator unit 107 includes a ringing machine start control circuit 510, a ringing interrupter circuit 520, a ringing tone sequence control circuit 530, an oscillator 540, and an amplifier 550. A ringing gate control circuit 560 is included in the line-link common equipment 103. Voltage waveforms which appear on the connecting leads during ringing are shown. The ring and tone generator unit 107 also includes a dial and busy tone generator 570.

The audio ringing tones are produced by a grounded base blocking oscillator 560 with a tuned collector circuit. The oscillator triggers when −10 volts is applied to any of the three input leads 1310, 1311 or 1312. An RC time-constant proportional to the resistance in the input lead determines the blocking frequency. Therefore by using different values for the resistors in the input leads the oscillator is able to generate three different tones, one at a time, depending upon which input lead is closed to −10 volts. The frequency of each tone can be individually adjusted by adjusting the value of the resistors in each of the input leads.

The tone sequence control circuit 530 is similar in operation to a free-running multivibrator and continuously places −10 volts on leads 1310, 1311 and 1312 in sequence, thereby producing the melodic tone combination.

The tone sequence control circuit is inhibited from operation by the interrupter circuit 520 to inhibit ringing tone in two situations. The first situation occurs when the ringing machine start control circuit 510 is not operative. This is provided so that ringing starts with a full sequence of the melodic tone combination. The second situation occurs when three sequences of three tones has been completed, then the interrupted circuit causes the sequence tone control circuit to pause for about three seconds before starting the next three sequences of three tones.

Figure 3:
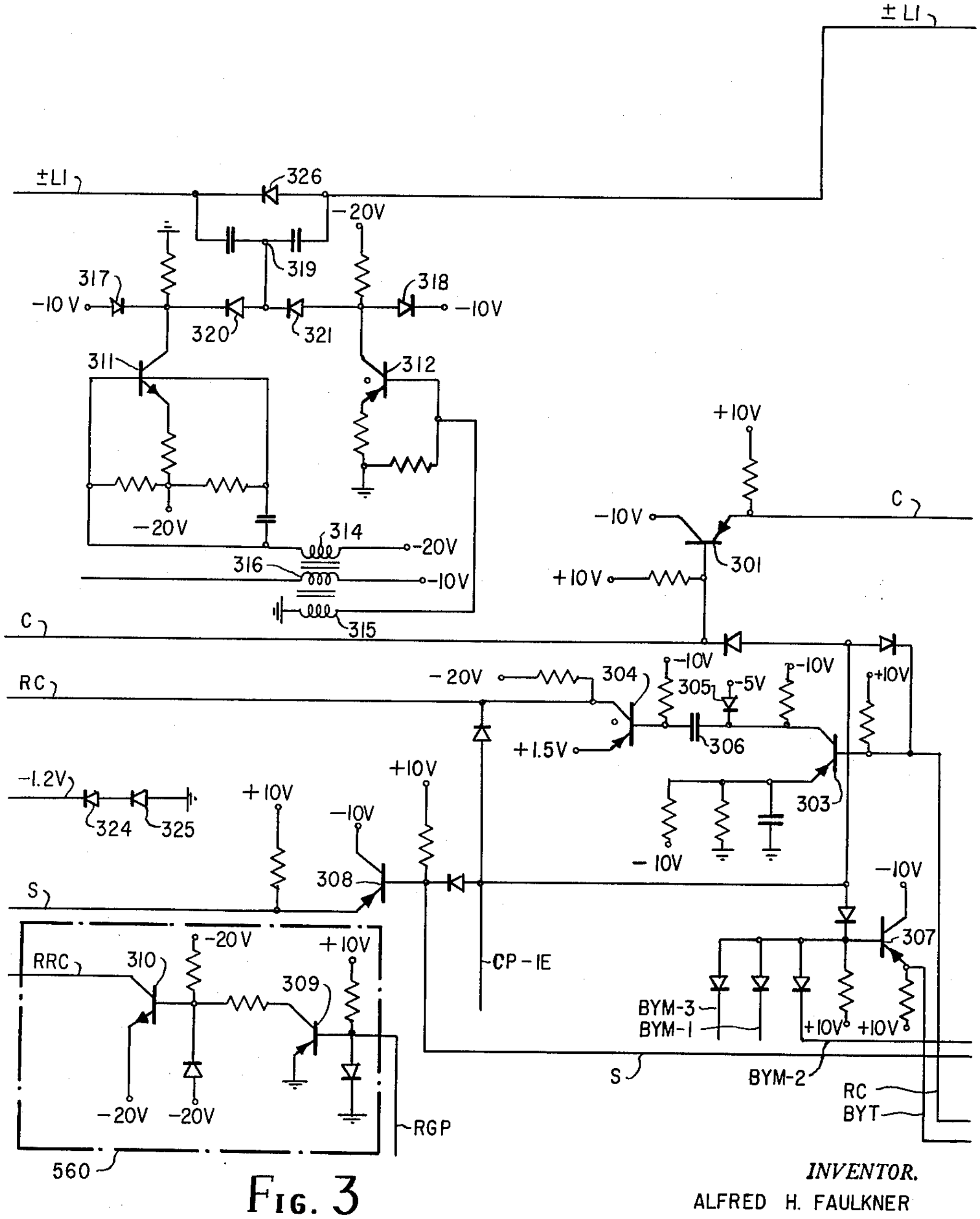
FIG. 3 is a schematic diagram of the line-link common equipment.

A detailed schematic diagram of the circuits 510, 520, 530, 540, and 550 is shown in FIG. 7, while circuit 560 is shown in FIG. 3.

As stated in section C5, titled "Ringing," when a link is ready to signal a called line, −10 volts is placed on lead RMST to start the ringing generator. Transistor 1313 is normally saturated, biased on clamping lead 1314 to about −1.5 volts through resistor 1315, diode 1316, and the collector-emitter path of transistor 1313. The −10 volts on lead RMST cuts off transistor 1313, causing diode 1316 to become reverse biased. The interrupter circuit 520 is thereby unclamped. The start circuit is not essential but has the advantage that ringing starts immediately after seizure of a called line and the first ring is always a full sequence of the melodic tone combination.

When diode 1316 becomes blocked, transistor 1317 which is normally cut off, is turned on and its collector is clamped through diode 1319 to a voltage between 0 and +1.2 volts, depending upon the setting of resistor 1320. The voltage on lead 1352 to sequence circuit 530 will always be negative as will be explained later, therefore diode 1322 is blocked as long as transistor 1317 is on. Due to the fact that transistor 1317 is saturated and its collector is clamped to a voltage depending on the setting of 1320, its emitter voltage and the emitter voltage of transistor 1318 can be adjusted by means of resistor 1320.

The base current of transistor 1317 charges capacitor 1323 to about +10 volts. This charge remains on capacitor 1323 as long as transistor 1317 is saturated.

Positive 10 volts through resistor 1324 and a 5 volt Zener diode 1325 to ground maintains a steady +5 volt potential at points 1329 and 1330 independent of variations in the voltage from the power supply. When a −10 volt pulse appears on lead 1332, and diode 1316 is still blocked, diode 1331 conducts and electrons flow through capacitor 1326, silicon-diode 1327, and capacitor 1328. This occurs when a sequence of three tones has been generated by the successive operation of transistors 1335, 1334, and 1333 as will be seen later.

The −10 volt pulse discharges capacitor 1328 to about 2 volts and since the initial charge on the capacitor 1328 was about 5 volts, the voltage at point 1336 is about +3 volts. The silicon diode 1337 is therefore blocked because the voltage at point 1341 is about 1 volt. The voltage at point 1329 of about +5 volts blocks diode 1338. The total voltage across capacitor 1326 is about 13 volts as long as the −10 volt pulse is present. When the pulse is removed due to the continued operation of the tone sequence control circuit as will be seen later, capacitor 1326 discharges through resistor 1339 and diode 1338 until the voltage across capacitor 1326 is 5 volts. Since the voltage at point 1340 was at +5 volts during the discharging of capacitor 1326, and the voltage at point 1336 was about +3 volts, the silicon diode 1327 is blocked and the charge remains on capacitor 1328.

When the second sequence of three tones has been completed, −10 volts again appears on lead 1332, the discharge current flows in the same path as described above and the voltage across capacitor 1328 drops to 1.4 volts. When −10 volts is removed from lead 1332, again due to the continued operation of the tone sequence control circuit, capacitor 1326 discharges again and diode 1327 blocks. The voltage at point 1336 is about −1.4 volts and the silicon diode 1337 is still blocked.

When −10 volts appears on lead 1332 for the third time, the discharge current flows in the same path as before. As capacitor 1328 discharges, the voltage at point 1336 drops from about +1.4 volts, and when the voltage at point 1336 drops to about .6 volt below the voltage at point 1341, diode 1337 conducts.

Transistor 1318 thereby turns on, and the voltage at point 1342 which was at about −10 volts when transistor 1318 was cut off now approaches 0 volts. The base of transistor 1317 now rises to about +10 volts cutting itself off and causing −10 volts to appear at lead 1343. The appearance of −10 volts on lead 1343 stops the operation of the tone sequence control circuit and hence the ringing tone, as will be seen later.

Therefore it can be observed that the tone sequence control circuit and hence the ringing tone is not operative when the ringing machine start control circuit is not operative and after the tone sequence control circuit has completed three sequences of three tones each, but as will be explained in the following, there will be but a 3-second pause before the tone sequence control circuit will be allowed to continue operation after it has been shut off due to the completion of the three sequences of three tones.

Continuing, the base current of transistor 1318 is supplied from point 1329 which is at +5 volts through one germanium diode 1338 and two silicon diodes 1327 and 1337 in series, which causes a voltage drop of about 1 volt, thus the voltage at the base of transistor 1318 is about +6 volts. The emitter voltages for both transistor 1318 and 1317 are about equal. During the time transistor 1318 is on, capacitor 1328 is charged about 5.5 volts. Due to the collector current of transistor 1318, the potential at point 1344 is at about ground. The voltage across capacitor 1323 is about 10 volts, thus the voltage at the base of transistor 1317 becomes +10 volts and transistor 1317 is cut off. To prevent this inverse base to emitter voltage from causing transistor 1317 to break down, diode 1345 is connected in series with the emitter of transistor 1317.

Hence it can be seen that —10 volts now appears on lead 1343 while transistor 1317 is cut off.

Transistor 1318 will continue to be cut off until capacitor 1323 discharges through resistor 1346 to about 5 volts where the base of transistor 1318 becomes negative with respect to its emitter and transistor 1318 begins to saturate. Then the voltage at point 1347 drops from about +6 volts to about +1 volt and transistor 1318 is cut off.

Since no —10 volts now appears on lead 1343, the tone sequence control circuit will resume operation until another three sequences of three tones has been completed.

If the called party answers during the ringing period, the tone sequence control circuit is not stopped and therefore ringing tone is not stopped in the ringing tone generator although the ringing tone will not be gated to the called subscriber, as will be explained later. The reason for this is, as has been stated, to insure a complete sequence of the melodic tone combination.

Explaining the above, it can be seen the —1.25 volts would appear on the collector of transistor 1313 if —10 volts did not appear on lead RMST. If this occurs during the ringing period when transistor 1317 is turned on, the current available from the ringing machine start control circuit is about .20 milliamperes and the inverse base current fed through resistor 1348 is about 23 milliamperes. Therefore, transistor 1318 cannot be turned on and hence transistor 1317 cannot be turned off during the ringing period. However, as soon as the ringing period is completed transistor 1318 will be turned on and transistor 1317 will be turned off.

Transistor 1318 will now turn on due to the three pulses on lead 1332 as has been expalined, and transistor 1317 will turn off. As long as transistor 1313 remains saturated the base voltage of transistor 1318 remains at about +3 volts and the emitter approximately the same. The collector is clamped to ground and after capacitor 1323 is completely discharged, a base current of about .03 milliamperes is supplied to transistor 1317. This base current, however, is not sufficient to provide a collector current in excess of 1.5 milliamperes which is required to bring the collector of transistor 1317 above —10 volts. Therefore, —10 volts is present on lead 1343 as long as transistor 1313 is saturated and operation of the tone sequence control circuit is prevented.

The number of pulses on lead 1332 required to turn transistor 1318 on depends upon the capacitance ratio of capacitors 1326 and 1328 and the emitter voltage at transistor 1318 when transistor 1317 is saturated. In order to compensate for the variation in the capacitance ratio due to standard tolerance, the emitter voltage for transistor 1318 is made adjustable by means of resistor 1320. Higher value for the capacitance ratio requires fewer pulses, and a lower emitter voltage at transistor 1318 requires more pulses.

Turning now to an explanation of the tone sequence control circuit associated with transistors 1333, 13334, and 1335, it can be seen that all these transistors are biased to cutoff and ground is normally placed on their output leads. When —10 volts is present on lead 1343, capacitor 1349 is not charged since lead 1352 and point 1353 are at about —10 volts. Capacitors 1350 and 1351 have a charge which is dependent upon the setting of resistor 1354 since the voltage at points 1355 and 1356 is approximately —10 volts and the voltage at points 1357 and 1358 is determined by the setting of resistor 1354. During this time the tone sequence control circuit is not operative.

When —10 volts is removed from lead 1343, that is when transistor 1317 is turned on, the voltage at point 1321 is then determined by the voltage at the slider of resistor 1354, which is between 0 and —10 volts. Point 1321 is negative, diode 1322 is not conducting and the interrupter circuit is not inhibiting the tone sequence control circuit.

Electrons flow from the —20 volt supply through resistor 1359, charge capacitor 1349, and flow through resistor 1360 to the +10 volt supply. Transistor 1335 saturates and places —10 volts on its output lead 1361. Diode 1362 conducts and capacitor 1350 discharges.

Transistor 1335 remains saturated until the voltage at point 1321 reaches the same value as the voltage at the slider of resistor 1354. Then diode 1363 conducts and the voltage across capacitor 1349 remains constant, that is, the charge current is zero. Therefore, transistor 1335 cuts off and ground is present at the collector of transistor 1335 which blocks diode 1362.

A similar charge current now flows through capacitor 1350 causing transistor 1334 to saturate and the circuit associated with transistor 1334 behaves in the same manner as the circuit associated with transistor 1335. When transistor 1334 turns off, transistor 1333 saturates. Again when transistor 1333 turns off, transistor 1335 starts to saturate and the tone sequence control circuit has completed one cycle. As has been explained, after three cycles or what has been called three sequences of three tones the tone sequence control circuit is interrupted for about three seconds.

The time for one sequence of three tones can be adjusted by adjusting resistor 1354. A greater negative setting of the slider of resistor 1354 causes a shorter time for one sequence.

Collector current from transistors 1335, 1334, and 1333 flows through resistors 1364, 1365, and 1366, respectively to lead RGP to the ringing gate control circuit 560 (FIG. 3). Also —10 volts or ground is impressed on leads 1310, 1311, and 1312 leading to the ringing tone oscillator to produce the melodic tone combination as will be hereinafter explained.

The ringing gate control amplifier 560 (FIG. 3) comprises transistors 309 and 310 and has input and output leads RGP and RRC respectively. It can be seen that the collector current from transistors 1333, 1334, and 1335 flows through lead RGP to the base of transistor 309 when any of these three transistors is saturated. This current causes transistor 309 to saturate, which in turn causes transistor 310 to saturated and place —20 volts on the output lead RRC. In order to understand the use of this circuit in the system, refer to the section titled "Ringing."

The ringing oscillator circuit will now be explained in detail. This oscillator is essentially a blocking oscillator with a frequency determined by an RC time constant. The collector circuit is tuned to a frequency lower than the inverse value of the RC time constant and tends to smooth the output waveform. This oscillator will oscillate at three different frequencies, one at a time, as will be explained later. These frequencies have been chosen as about 500 cycles per second, 600 cycles per second, and 400 cycles per second, in that order.

An NPN transistor 1309, indicated as such, is used. The emitter direct current voltage (—10 volts or ground) is supplied by the tone sequence control circuit over leads 1310, 1311 and 1312. When ground is present on all oscillator input leads 1310, 1311 and 1312, transistor 1309 is biased to cutoff and output is ceased. This occurs when ringing tone is not required and when three sequences of the three tones have been completed as has been previously explained.

When —10 volts appears on any input, for example, lead 1312, capacitor 1367 which is the feed back capacitor, charges through resistor 1368 and part of transformer 1369. As capacitor 1367 charges, the voltage at point 1370 drops. When it reaches approximately —5 volts, transistor 1309 turns on and its collector drops from +5 volts.

The current through capacitor 1367 changes direction and starts discharging capacitor 1367. This discharge current provides a positive feed back through resistor 1371 which limits the current during the first part of the cycle.

As capacitor 1367 discharges, the collector current has to increase in order to sustain a constant feed back current, but a constant feed back current only provides a constant collector current. Therefore, the feed back current starts to decrease causing a decrease in the collector current which causes the voltage across transformer 1369 to reverse. The feed back current now becomes negative and turns off transistor 1309 and feed back capacitor 1367 charges through the same path as described above. As capacitor 1367 charges, the voltage at point 1370 drops to about —5 volts causing transistor 1309 to turn on again and a second cycle is started.

The time constant involved in the charging path determines the oscillator frequency. Each input is therefore individually tuneable by means of resistors 1368, 1372 and 1373.

It should now be clear that three different tones are produced one at a time followed by a pause and if necessary another sequence of three different tones one at a time.

Before the tone sequence emerges from the ringing tone generator circuits it is passed over lead 1374 to an amplifier associated with transistor 1375. This amplifier circuit is purposely overdriven by the nearly sinusoidal input signal to produce a rectangular output signal in order to affect the high efficiency of conversion of the multiplex control signals into audio frequency signalling in the line circuit.

The ringing tone is taken directly from the collector of transistor 1375 on lead RG and its use has been specifically explained.

The ring back tone signal level is reduced to an appropriate value by the voltage divider of capacitor 1376 and resistor 1377 and is placed on lead RBT and is used in a manner described in section C5 titled "Ringing."

D2. *Subsets A and B*

The subsets which terminate the various lines of the system are identical and well-known in the art with the exception that tone signalling is used in lieu of the usual ring.

Figure 2:
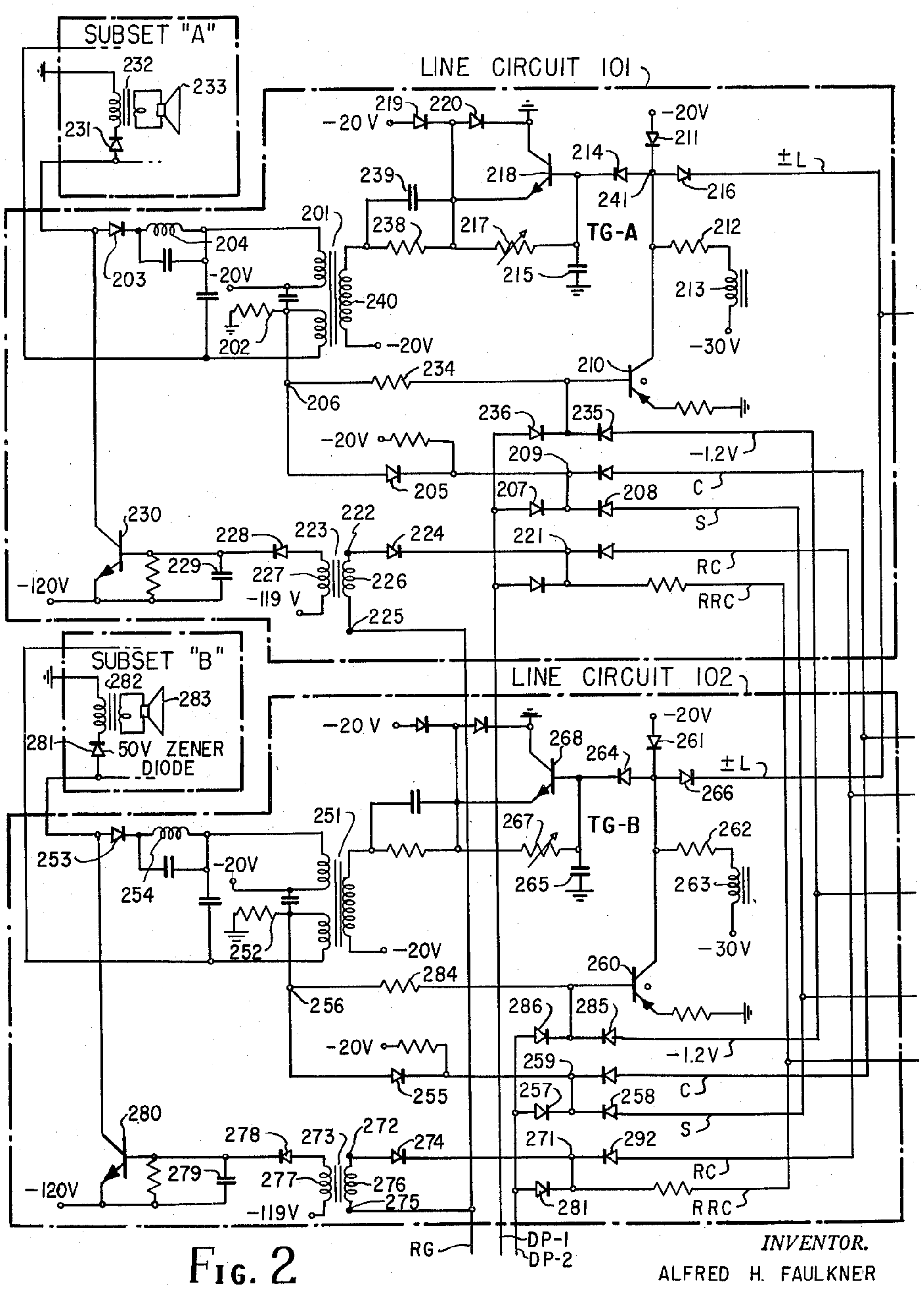
FIG. 2 is a schematic diagram of two line circuits.

There is illustrated in FIG. 2 two subsets; subset "A" which terminates line 1; and subset "B" which terminates line 2. The only parts of either subset which are shown are the 50 volt Zener diodes 231 and 281, the loudspeaker audio transformers 232 and 282 and the loudspeakers 233 and 283. All the other equipment is conventional and need not be explained. The Zener diode is a well-known item and need not be explained.

From the above it can be seen that the ringing signal will be an audio tone transformed from electrical energy into sound by the loudspeakers 233 and 283.

D3. *Line circuits*

As has been previously stated, the two line circuits 101 and 102 are utilized to terminate the lines 1 and 2. These two circuits as well as the line circuits terminating the other lines of the system, lines 3 to 0, are identical in circuitry and mode of operation. Since both line circuits 101 and 102 are identical in every respect, the following description will be confined to line circuit 101 illustrated in detail in FIG. 2.

When the subscriber at subset "A" of line circuit 101 initiates a call, a circuit is completed from ground through resistor 202, a winding on transformer 201, the subscriber's line loop, diode 203, inductor 204, and a second winding on transformer 201 to —20 volts. The loop resistance is compensated in the subscriber's subset "A" and all other subsets to provide a line current of 30 milliamperes. Thus there is a 10 volt drop across resistor 202 which appears across diode 205 biasing it in the reverse direction.

Point 209 remains near ground, however, due to shunt paths through diodes 207 and 208 to ground on leads DP–1 and S, respectively. Actually there is approximately +1.5 volts on lead DP–1 obtained from the pulse distributor circuit. The pulse distributor circuit cyclically removes the +1.5 volts for 2 microseconds out of every 20 microseconds, defining time slot 1 allocated to line 1.

Point 209 remains near ground during time slot 1 due to the ground normally on lead S. As has been previously stated, when a link is free to answer calls and is selected for use by the allotter it sends out a continuous train of pulses spaced at 22 microsecond intervals on lead S. When such a pulse appears on lead S in coincidence with a similar pulse on lead DP–1, point 209 swings to —5 volts and transmits a pulse over lead C to the scanning link through the line-link common equipment.

Upon receipt of such a pulse over lead C the link ceases its scanning operation as has been previously stated and thereafter sends a continuous train of pulses in time slot 1 on lead S, these pulses being returned over lead C as long as the loop circuit to subset "A" remains closed.

The —10 volts appearing across resistor 202 is also applied to the base of transistor 210 of gate TG–A through resistor 234. The base of transistor 210 is normally clamped to lead DP–1 and hence approximately +1.5 volts. Thus transistor 210 is cut off except during time slot 1 when the base voltage of transistor 210 becomes —1.2 volts. The base voltage of transistor 210 is clamped to—1.2 volts through diode 235 and two silicon diodes 324 and 325 in series to ground. Diodes 324 and 325 are located in the line-link common equipment shown in FIG. 3. There is approximately a 0.6 volt drop across each.

When transistor 210 conducts, a current of 12 milliamperes flows from the collector of transistor 210. A current of 2 milliamperes is normally flowing from —20 volts through diode 211, resistor 212, and inductor 213 to —30 volts. With transistor 210 conducting, this 2 milliampere current is obtained from the collector of transistor 210 since diode 211 will be reverse biased.

The remaining 10 milliamperes flows through diode 214 and discharges capacitor 215 during the first half of the current pulse, then is switched through diode 216 to the common transmission line ±L for the second half of the pulse. During speech transmission the current is switched earlier or later than the midpoint.

The average voltage across capacitor 215 is —10 volts, the discharge effected by transistor 210 in time slot 1 being partially made up for between pulses by the base input circuit of transistor 218. The base-emitter path of transistor 218 is shunted by variable resistor 217 which is adjusted so as to provide a net current gain of 15 in the emitter follower circuit in which transistor 218 is connected. As a result of this current gain the 1000 ohm line impedance seen looking into transformer 201 is changed to 15,000 ohms looking into the base of transistor 218 but without any change in voltage level.

Dial tone is transmitted from the link circuit to the line loop over the common highway ±L and through this transmission gate TG–A.

During dialling excessive voltages would be applied to the transmission circuit due to the rapid decay of flux in transformer 201 upon interruption of the line circuit, if no measures were taken to prevent it. Diodes 219 and 220 limit the voltage applied to the emitter of transistor 218 to values between ground and —20 volts as can be readily observed.

Each time that the line loop is opened by the impulse contacts of the dial, the point 209 is clamped to ground through diode 205 and resistor 202, thus interrupting the train of pulses on lead C in time slot 1 for the duration of the dial impulse. Conduction of transistor 210 is also need for transmission at this time. The pulses on lead C interrupted but this in inconsequential since there is no in time slot 1 are interrupted in like manner when the subscriber hangs up. These interruptions in the pulse train control operations in the link in the manner described previously in the general explanation of the system.

Dial tone, busy tone, ring-back tone, and speech transmission are all sent over the transmission common highway ±L and through the transmission gate TG–A.

When subset "A" through line 1 is called by another subscriber the ringing generator is started, as has been stated, causing −20 volts to be applied to lead RRC during the ringing interval and a train of pulses in time slot 1 is transmitted over lead RC by the link circuit serving the calling subscriber. For the duration of the coincident pulses on leads DP–1 and RC, −5 to −7 volts is applied from point 221 to point 222 of transformer 223 through diode 224.

Lead RG which is connected to terminal 225 of transformer 223 is alternately clamped to ground and raised to −10 volts at the ringing frequency rate as can be understood by reference to circuit explanation entitled "Ringing and Tone Generator." Assuming that lead RG is clamped to ground the current flow in winding 226 of transformer 223 increases linearly at a rate determined by the applied voltage and the inductance of winding 226 of transformer 223, reaching 3 to 4 milliamperes by the end of time slot 1.

The secondary winding 227 of transformer 223 is effectively open-circuited at this time since the induced voltage biases diode 228 in the reverse direction because of the winding arrangement of transformer 223.

When the pulse on lead DP–1 expires it clamps point 221 to +1.5 volts through diode 237. The flux in transformer 223 now commences to decay, reversing the voltage induced in its secondary and hence causing current to flow through diode 228 and the base-emitter path of transistor 230.

The low forward resistance of this circuit beyond the characteristic knee limits the voltage across winding 227 of transformer 223 to between ½ and 1 volt. The flux therefore decays at only one-tenth the rate at which it rose during the input pulse.

The primary voltage is also limited by reason of the nature of the secondary load, hence diode 224 remains reverse biased. Current flows in the secondary winding 227 of transformer 223 for practically the entire 18 microsecond interval between successive input pulses.

Capacitor 229 smooths the waveform so as to provide a continuous drive to the base of transistor 230. The amplified current from the collector of transistor 230 flows over lead −L and a 50 volt Zener diode 231 in subset "A" to ground through the speaker transformer 232.

As can be seen, this current varies in accordance with the ringing signal on lead RG producing an audible signal at subset "A."

Now when the called subscriber answers the −10 volts developed across resistor 202 by closure of the line loop results in a pulse train on lead C, as has been explained, which causes the link circuit to interrupt the pulse train on lead RC as has been previously stated, thus stopping the ring.

D4. *Line-link common equipment*

The line-link common equipment in FIG. 3 includes the ringing gate control circuit 560 described in the section titled "Ringing Tone Generator," the diodes 324 and 325 described in the section titled "Line Circuits," a clamping circuit for preventing crosstalk on the common highway ±L, and amplifiers associated with the common control conductors. These control conductor amplifiers will now be described.

The lead C has associated therewith an emitter follower amplifier including transistor 301. The amplifier is biased as a "Class A" emitter follower amplifier and its function is to match the high impedance of the line circuit to the low impedance of the link circuit. The pulse on lead CP–1E is also fed to the base of transistor 301 in order to obtain a fast response. Therefore, by this circuit a −5 volt pulse on the input at the base of transistor 301 is translated into a −5 volt pulse at the emitter of transistor 301 but with the desired impedance match.

Turning to lead S therein is an amplifier associated with transistor 308 identical to that on lead C but the input is from the link and the output if to the line circuit. Therefore the high impedance of the link is matched with the low impedance of the line.

The amplifier on the lead RC is a two-stage amplifier and this amplifies the pulse amplitude. The input pulse is at −5 volts but the output pulse is an 8.5 volt pulse, going from +1.5 volts when the pulse is absent to −7 volts during the time the pulse is on. Transistor 303 is biased to cutoff and the emitter of transistor 303 is at about 1.25 volts. When the pulse appears on the RC lead from the link, a pulse on lead CP–1E appears at the same time thus aiding in a fast turn off of transistor 303. The collector of transistor 303 is clamped to −5 volts through diode 305. A capacitive coupling between the collector of transistor 303 and the base of transistor 304 is provided by the capacitor 306. Transistor 304 is normally saturated and +1.5 volts appears on the lead RC extending to the line. Therefore when the negative pulse appears on the RC lead from the link at the base of transistor 303, transistor 303 turns on and transistor 304 turns off placing −7 volts on lead RC going to the line circuit.

The amplifier associated with the busy mark leads BYM–1, BYM–2, BYM–3, and BYT does not match the line circuit to the link circuits but rather the links to each other. The function of the busy mark amplifier in the system has been previously explained in the general description of the system.

The busy mark amplifier associated with transistor 307 has three inputs, any of which will trigger the amplifier. There is also a clock pulse on any of the three input leads. Therefore, a negative pulse on either lead BYM–1, BYM–2, or BYM–3, will cause a negative pulse on lead BYT. Since the transistor 307 is used in an emitter follower circuit and a −5 volt pulse is present on the input leads whenever there is a pulse at the input leads, it can be seen that the output pulses on lead BYT are −5 volts in amplitude as well.

What is claimed is:

1. In a ringing tone generator for supplying tone signals over a telephone line to an electro-acoustic transducer of a substation; generator means having an output circuit and a plurality of input circuits for transmitting a tone signal over the output circuit responsive to the actuation of any one of the input circuits, the frequency of the tone being dependent upon the input circuit being actuated; switching means for cyclically actuating said input circuits in succession, thereby causing a sequence of different tones to be repeatedly transmitted over said output circuit, each sequence corresponding to one cycle of the switching means; and interrupter means responsive to the completion of a predetermined number of complete cycles of the switching means for producing a spacing interval between groups of tone sequences transmitted over said output circuit; whereby a chime-like ringing signal comprising groups of tone sequences is produced in said transducer, each sequence being a plurality of different tones in succession, each group being a plurality of complete sequences, and the groups being separated by a silent interval.

2. In a ringing tone generator, the combination as claimed in claim 1, wherein said switching means includes an adjustable arrangement for determining the duration of actuation of each of said input circuits during each cycle, whereby the duration of each sequence may be varied.

3. In a ringing tone generator, an oscillator having an output circuit and a plurality of input circuits, each input circuit including a frequency-determining element; a sequence control circuit comprising a plurality of switching devices having respective output circuits individually connected to said oscillator input circuits, circuit means in the sequence control circuit, including said devices, for repeatedly transmitting a control signal over successive ones of said device output circuits to the corresponding oscillator input circuits, means in said oscillator for transmitting a tone signal over its output circuit responsive to a control signal applied to any one of its input circuits, the frequency of the tone signal being determined by the input circuit being signalled, thereby causing a sequence of different tones to be repeatedly transmitted over said oscillator output circuit, each sequence corresponding to one cycle of the sequence control circuit; interrupter means having an output circuit connected to a first one of said devices of the sequence control circuit, a switching arrangement having alternate first and second conditions, means responsive to the first condition for applying an inhibiting potential over the interrupter output circuit to said first device and responsive to the second condition for removing the inhibit potential, starting means for initially operating the switching arrangement to its second condition to initiate the cycling operation of the sequence control circuit, means responsive to the completion of a predetermined number of cycles of the sequence control circuit for operating said switching arrangement to its first condition to thereby interrupt the cycling operation of the sequence control circuit, and timing means for reoperating the switching arrangement to its second condition after a predetermined time period in the first condition; whereby the signal transmitted over the oscillator output circuit comprises groups of tone sequences, in which each sequence is a plurality of different tones in succession, each group is a predetermined number of sequences in succession, and the groups are separated by a predetermined time period.

4. In a ringing tone generator, the combination as claimed in claim 3, wherein said oscillator is a blocking oscillator comprising a transistor having base, emitter and collector electrodes; a capacitor connected in a circuit path between the collector and emitter electrodes; said frequency-determining elements in said input circuits are resistors which act in conjunction with the capacitor to determine the tone frequency; and said oscillator output circuit includes a parallel resonant circuit.

5. In a ringing tone generator, the combination as claimed in claim 3, wherein in said sequence control circuit said switching devices are transistors having emitter, base and collector electrodes; a coupling arrangement comprising resistance, capacitance and direct-current biasing means connected between the collector electrode of each transistor and the emitter electrode of the succeeding transistor for causing each transistor to transmit said control signal for an interval of predetermined duration and then switch to the next transistor once per cycle; and an adjustable element common to said coupling arrangements for varying said predetermined duration.

6. In a ringing tone generator, the combination as claimed in claim 3, wherein said switching arrangement comprises a transistor having emitter, base and collector electrodes wherein said first and second conditions correspond to respective states of conduction of the transistor and said inhibit potential is the collect potential in the first condition.

References Cited in the file of this patent

UNITED STATES PATENTS

| | | |
|---|---|---|
| 2,276,660 | Krom | Mar. 17, 1942 |
| 2,667,632 | Grandstaff | Jan. 26, 1954 |
| 2,674,734 | McCreary | Apr. 6, 1954 |